United States Patent
Bentley et al.

(10) Patent No.: US 9,467,653 B2
(45) Date of Patent: Oct. 11, 2016

(54) SYSTEM AND METHOD FOR AGGRESSIVE DOWNSTREAM BANDWIDTH CONSERVATION BASED ON USER INACTIVITY

(75) Inventors: Jon L. Bentley, New Providence, NJ (US); Parameshwaran Krishnan, Basking Ridge, NJ (US); Moni Manor, Santa Clara, CA (US); Peter Tarle, Ontario (CA)

(73) Assignee: Avaya Inc., Basking Ridge, NJ (US)

( * ) Notice: Subject to any disclaimer, the term of this patent is extended or adjusted under 35 U.S.C. 154(b) by 221 days.

(21) Appl. No.: 13/538,321

(22) Filed: Jun. 29, 2012

(65) Prior Publication Data

US 2014/0003450 A1    Jan. 2, 2014

(51) Int. Cl.
*H04B 1/66* (2006.01)
*H04N 7/15* (2006.01)
*H04N 7/26* (2006.01)

(52) U.S. Cl.
CPC ...................................... *H04N 7/15* (2013.01)

(58) Field of Classification Search
None
See application file for complete search history.

(56) References Cited

U.S. PATENT DOCUMENTS

| | | | |
|---|---|---|---|
| 6,735,193 B1 * | 5/2004 | Bauer et al. | 370/352 |
| 2002/0126626 A1 * | 9/2002 | Singh et al. | 370/260 |
| 2003/0043785 A1 * | 3/2003 | Liu et al. | 370/352 |
| 2003/0052911 A1 * | 3/2003 | Cohen-solal | 345/738 |
| 2005/0099492 A1 * | 5/2005 | Orr | 348/14.08 |
| 2009/0268008 A1 * | 10/2009 | Topits | H04M 3/567 348/14.09 |
| 2010/0080374 A1 | 4/2010 | Hepworth et al. | |
| 2012/0075408 A1 * | 3/2012 | Dasgupta et al. | 348/14.09 |
| 2012/0257065 A1 * | 10/2012 | Velarde et al. | 348/175 |
| 2013/0290993 A1 * | 10/2013 | Cheung et al. | 725/10 |

* cited by examiner

Primary Examiner — Ayaz Sheikh
Assistant Examiner — Sori Aga (57) ABSTRACT

System and method to manage bandwidth used by an endpoint of a communication session, the method including: detecting, by a sensor coupled to a communication system transporting the communication session, an indicia of a user; inferring, by a processor of the communication system transporting the communication session, a first involvement by the user in the communication session, wherein inferring is based upon the detected indicia of the user; and modifying, by the communication system transporting the communication session, a bandwidth of the communication session based upon the first inferred involvement by the user.

20 Claims, 6 Drawing Sheets

SYSTEM AND METHOD FOR AGGRESSIVE DOWNSTREAM BANDWIDTH CONSERVATION BASED ON USER INACTIVITY

BACKGROUND

1. Field of the Invention

Embodiments of the present invention generally relate to bandwidth management of communication sessions, and, in particular, to a system and method for aggressive bandwidth management in audio and/or video conferencing systems, webinars, web conferences, virtual reality session, and the like 2. Description of Related Art In today's market, the use of video services, such as video conferencing, is experiencing a dramatic increase. Since video services require a significantly larger amount of bandwidth compared to audio services, this has caused increased pressure on existing communication systems to provide the necessary bandwidth for video communications. Because of the higher bandwidth requirements of video, users are constantly looking for products and services that can provide the required video services efficiently and within the limits of available lower-cost bandwidth. One way to do this is to provide solutions that reduce and/or optimize the bandwidth used by video services.

Some video conferencing users actively observe at all times, and participate whenever needed. Other users are less active participants, and may devote less than full attention during the video conference, e.g., by multitasking during the video conference, while participating more actively in the video conference only for a few topics. Other video conferencing users may be absent participants who may walk away entirely from their telecom endpoints during some portion of the video conference. Conventional systems will devote sufficient resources (e.g., bandwidth, CPU or memory utilization, etc.) to service active users, which would be more resources than are needed to service less active or absent participants, thereby causing a waste of the system resources.

In the background art, a lack of sound from a user's telecom endpoint may allow a video conferencing system to auto-mute the telecom endpoint and thereby conserve upstream bandwidth. Similar approaches can also be used to video-mute an absent user's endpoint, again for reducing upstream bandwidth. Some systems may mute an endpoint if a call is auto-answered (e.g., answered by an answering machine), for reasons of privacy, for reducing annoyance to nearby persons, and/or conserving upstream bandwidth. Some systems may mute an endpoint in order to reduce noise originating from connected but unused or underutilized telecom endpoints, but do not have sophisticated methods of detecting when a telecom endpoint is unused or underutilized.

Therefore, a need exists to provide improved methods of detecting when a telecom endpoint is unused or underutilized, in order to improve upstream bandwidth conservation, and ultimately improved customer satisfaction through greater resource availability.

SUMMARY

Embodiments of the present invention generally relate to bandwidth conservation techniques during an audio and/or video conference call, and, in particular, to a system and method for reducing the data streamed to users who are inferred to be not actively participating in the conference call.

In one embodiment, a method to manage bandwidth used by an endpoint of a communication session, includes: detecting, by a sensor coupled to a communication system transporting the communication session, an indicia of a user; inferring, by a processor of the communication system transporting the communication session, a first involvement by the user in the communication session, wherein inferring is based upon the detected indicia of the user; and modifying, by the communication system transporting the communication session, a bandwidth of the communication session based upon the first inferred involvement by the user.

Embodiments in accordance with the present invention provide a system and method to manage bandwidth used by an endpoint of a conference call, the method including: detecting, by a sensor coupled to a communication system transporting the conference call, an indicia of a user; inferring, by a processor of the communication system transporting the conference call, a first involvement by the user in the conference call, wherein inferring is based upon the detected indicia of the user; and modifying, by the communication system transporting the conference call, a bandwidth of the conference call based upon the first inferred involvement by the user.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize detectors and processors to detect and analyze physical characteristics of users of a telecom endpoint or the environment of a telecom endpoint, and to make decisions based upon models, parameters, policies, or the like that may be stored in a database and are communicatively accessible to a server.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

The terms "switch," "server," "contact center server," or "contact center computer server" as used herein should be understood to include a Private Branch Exchange ("PBX"), an ACD, an enterprise switch, or other type of telecommunications system switch or server, as well as other types of processor-based communication control devices such as, but not limited to, media servers, computers, adjuncts, and the like.

As used here, the terms "telecom endpoint" and "terminal" may be used interchangeably.

The terms "switch," "server," "contact center server," or "contact center computer server" as used herein should be understood to include a Private Branch Exchange ("PBX"), an ACD, an enterprise switch, or other type of telecommunications system switch or server, as well as other types of processor-based communication control devices such as, but not limited to, media servers, computers, adjuncts, and the like.

As used herein, upstream or uplink is understood to refer to a communication direction from a user or telecom endpoint toward a communication server. Downstream or downlink is understood to refer to a communication direction from a communication server toward a user or telecom endpoint.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "transmitter" may generally comprise any device, circuit, or apparatus capable of transmitting an electrical signal.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

Control of bandwidth conservation in a video and/or audio conference may be viewed as a policy-driven problem that balances bandwidth conservation and cost control against hassle-free bandwidth availability for users. Embodiments in accordance with the present invention are applicable to video telecom endpoints that may send and/or receive both audio and video data streams, and to telecom endoints that may send and/or receive only an audio data stream.

Bandwidth conservation policy may be viewed as a mix-and-match collection of at least five major components. The first component in accordance with an embodiment of the present invention is a mechanism to sense the involvement of the caller. The second component is a spectrum of degradations to signal quality that require decreasing amounts of bandwidth. The third component is a proactive warning before the reduction is taken. The fourth component is a way for a user to undo the degradation. The fifth component is a cost model for bandwidth. Which aspects of the components should be included in any particular implementation will depend on the context, and policy decisions may vary the components over time, even within a context.

Figure 1A:
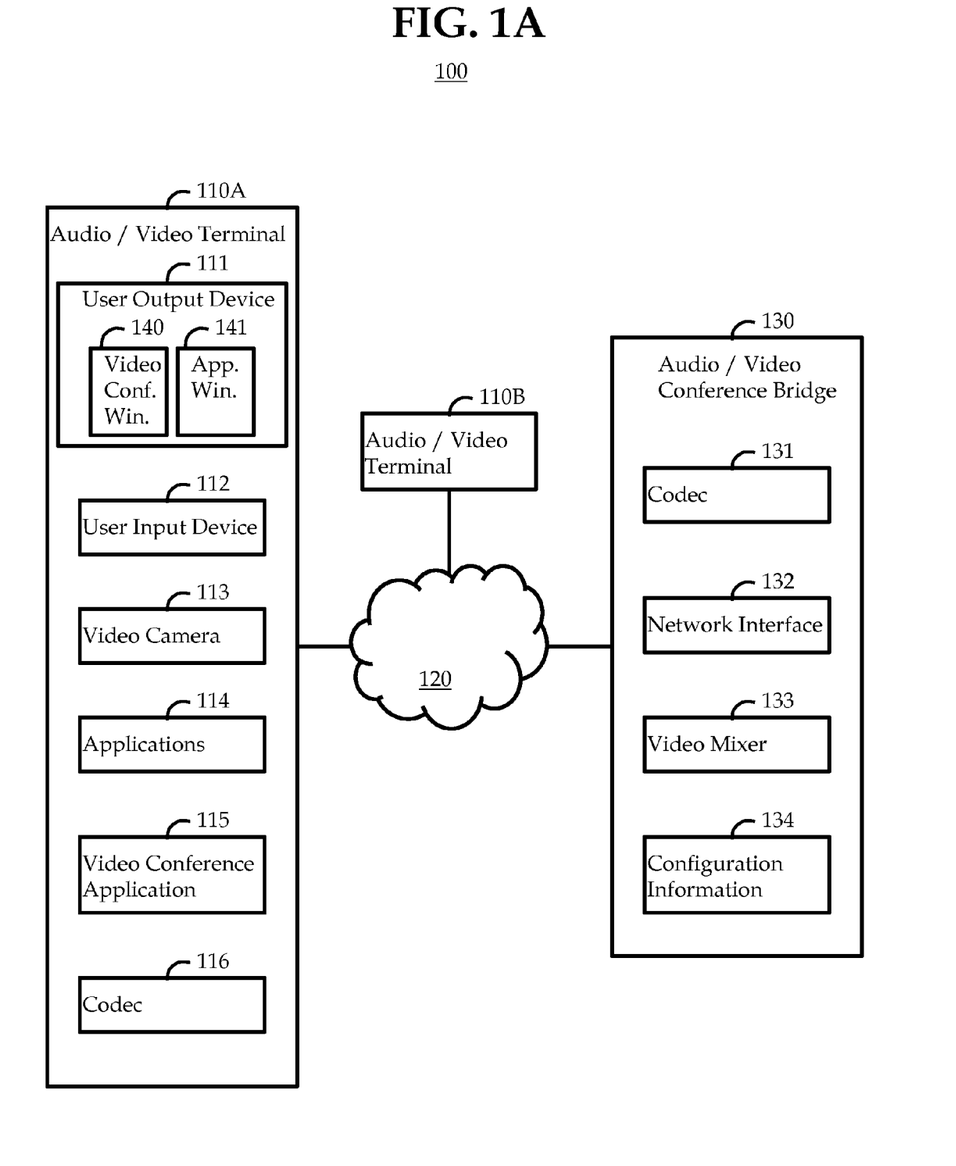
FIG. 1A is a block diagram depicting a first illustrative system for detecting a change of activity level by a user and changing the stream of an active video conference based on the change of activity level in accordance with an embodiment of the present invention.

FIG. 1A is a block diagram of a first illustrative system 100 for detecting activity or inactivity by a user and changing the stream of an active video conference based on the detected activity or inactivity. First illustrative system 100 comprises audio/video ("A/V") telecom endpoints 110A-110B, network 120, and video conference bridge 130. Audio/video telecom endpoint 110A can be any type of communication device that can output a video and/or audio stream, such as a telephone, a cellular telephone, a Personal Computer (PC), a Personal Digital Assistant (PDA), a monitor, a television, a conference room video system, and the like. Audio/video telecom endpoint 110A further comprises a user output device 111, a user input device 112, a video camera 113, application(s) 114, video conference application 115 and codec 116. In FIG. 1A, audio/video telecom endpoint 110A is shown as a single device; however, audio/video telecom endpoint 110A can be distributed between multiple devices. For example, audio/video telecom endpoint 110A can be distributed between a telephone and a personal computer.

Figure 1B:
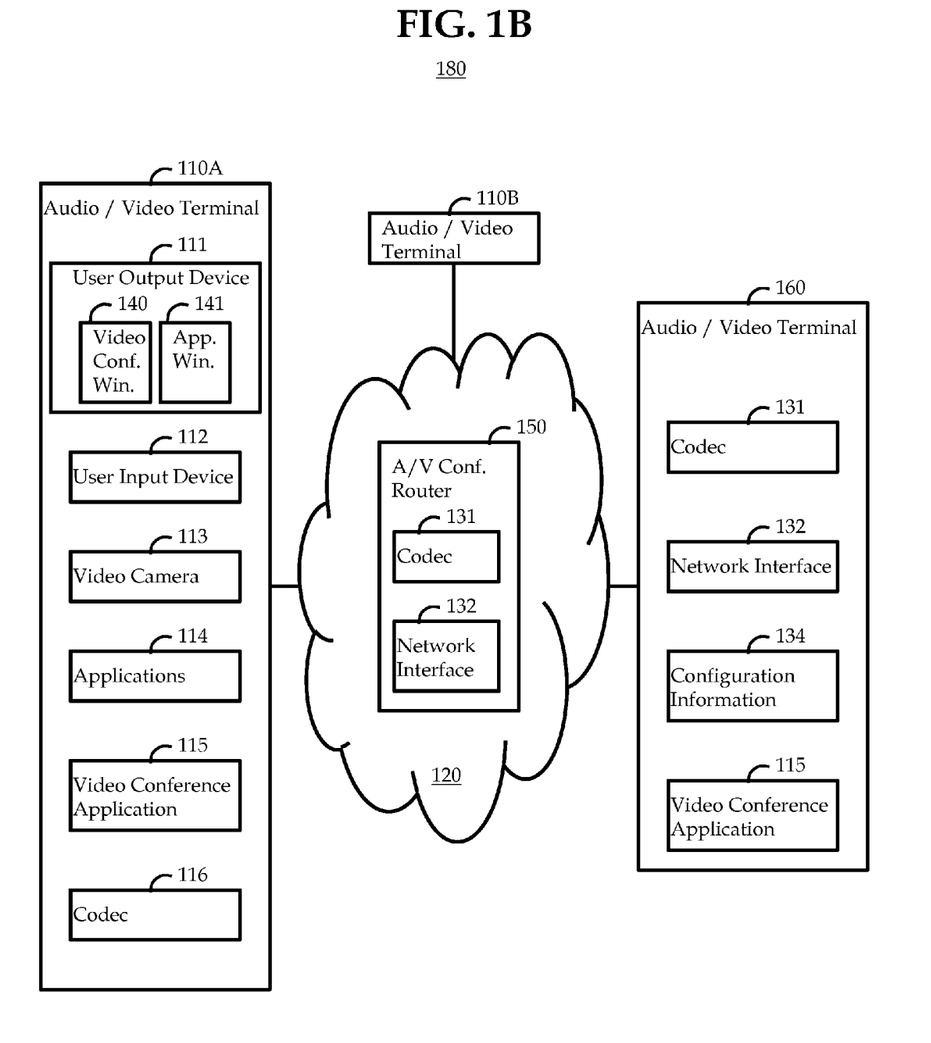
FIG. 1B is a block diagram depicting a second illustrative system for detecting a change of activity level by a user and changing the stream of an active video conference based on the change of activity level, in accordance with an embodiment of the present invention.

User output device 111 can include an output audio interface (e.g., speaker, headset, headset electrical connector, etc.) and/or any type of display (e.g., a Liquid Crystal Display (LCD), a Cathode Ray Tube (CRT), a monitor, a television, optical or electrical interface thereto, etc.). The embodiment of user output device 111 depicted in FIGS. 1A-1B is shown further comprising video conference window 140 and application window 141. Video conference window 140 may comprise a display of the stream(s) of the active video conference. The stream(s) of the active video conference typically comprise(s) an audio portion and a video portion. Application window 141 is one or more windows of an application 114 (e.g., a window of an email program). Video conference window 140 and application window 141 can be displayed separately or at the same time.

User input device 112 can be any type of device that allows a user to provide input to audio/video telecom endpoint 110, such as a keyboard, a mouse, a touch screen, a track ball, a touch pad, a switch, a button, and the like. Video camera 113 can be any type of video camera, such as an embedded camera in a PC, a separate video camera, an array of cameras, and the like.

Application(s) 114 can be any type of application, such as an email program, an Instant Messaging (IM) program, a word processor, a spread sheet, a telephone application, and the like. Video conference application 115 is an application that processes various types of video communications, such as a codec 116, a video conferencing software/software, and the like. Codec 116 can be any hardware/software that can decode/encode a video and/or audio stream. Elements 111-116 are shown as part of Audio/video telecom endpoint 110A. Likewise, audio/video telecom endpoint 110B can have the same elements or a subset of elements 111-116.

Network 120 can be any type of network that can handle video traffic, such as the Internet, a Wide Area Network (WAN), a Local Area Network (LAN), the Public Switched Telephone Network (PSTN), a cellular network, an Integrated Digital Services Network (ISDN), and the like. Network 120 can be a combination of any of the aforementioned networks. In this exemplary embodiment, network 120 is shown connecting audio/video telecom endpoints 110A-110B to video conference bridge 130. However, audio/video telecom endpoint 110A and/or 110E can be directly connected to video conference bridge 130. Likewise, additional video telecom endpoints (not shown) can also be connected to network 120 to make up larger video conferences.

A/V conference bridge 130 can be any device/software that can provide video and/or audio services, such as a video server, a Private Branch Exchange (PBX), a switch, a network server, and the like. A/V conference bridge 130 can bridge/mix video and/or audio streams of an active video conference. A/V conference bridge 130 is shown external to network 120; however, video conference bridge 120 can be part of network 120. A/V conference bridge 130 further comprises codec 131, network interface 132, video mixer 133, and configuration information 134. A/V conference bridge 130 is shown comprising codec 131, network interface 132, video mixer 133, and configuration information 134 in a single device; however, each element in A/V conference bridge 130 can be distributed.

Codec 131 can be any hardware/software that can encode a video signal. For example codec 131 can encode one or more compression standards, such as H.264, H.263, VC-1, and the like. Codec 131 can encode video protocols at one or more levels of resolution. Network interface 132 can be any hardware/software that can provide access to network 120 such as a network interface card, a wireless network card (e.g., 802.11g), a cellular interface, a fiber optic network interface, a modem, a T1 interface, an SDH or SONET interface, an ISDN interface, and the like. Video mixer 133 can be any hardware/software that can mix two or more video and/or audio streams into a composite video and/or audio stream, such as a video server. Configuration information 134 can be any information that can be used to determine how a stream of the video conference can be sent. For example, configuration information 134 can comprise information that defines under what conditions a specific video resolution will be sent in a stream of the video conference, when a video portion of the stream of the video conference will or will not be sent, when an audio portion of the stream of the video conference will or will not be sent, and the like. Configuration information 134 is shown in A/V conference bridge 130. However, configuration information 134 can reside in audio/video telecom endpoint 110A.

After a video conference is set up (typically between two or more audio/video telecom endpoints 110), video mixer 133 mixes the video and/or audio streams of the video conference using known mixing techniques. For example, video camera 113 in audio/video telecom endpoint 110A records the live image of a user (not shown) and sends a video and/or audio stream to A/V conference bridge 130, which is then mixed (usually if there are more than two participants in the video conference) by video mixer 133. In addition, the video conference can also include non-video devices, such as a telephone (where a user only listens to the audio portion of the video conference). Network interface 132 sends the stream of the active video conference to the audio/video telecom endpoint 110A in the video conference. For example, audio/video telecom endpoint 110A receives the stream of the active video conference. Codec 116 decodes the video and/or audio stream and the video stream is displayed by video conference application 115 in user output device 111 (in video conference window 140). The audio stream also will be outputted by user output device 111.

Embodiments in accordance with the present invention are also usable with audio-only conference calls in order to adjust the amount of audio bandwidth devoted to the upstream and/or downstream path of an audio-only conference call, in order to adjust the amount of audio bandwidth to the perceived or inferred activity or lack of activity by a participant of the audio-only conference call.

Embodiments in accordance with the present invention provide several advantages compared to the background art. For example, embodiments may take into account detection of user inactivity, or the lack of detection of user activity, in order to derive indicia of activity or inactivity. Embodiments may take into account detection of user inattention, or the lack of detection of user attention, in order to derive indicia of attention or inattention. Embodiments may take into account implicit hints from a user regarding presence, in addition to explicit acts by a user, in order to tune bandwidth intelligently.

Detection may be by way of a sensor coupled to the telecom endpoint. For example a camera may be used to detect the environment of the telecom endpoint, and/or a motion sensor may be used to detect motion in the vicinity of the telecom endpoint. In other embodiments, detection may be by way of software-based processes executing on the telecom terminal, the processes configured to detect usage or lack of usage of the telecom terminal, for instance detecting other processes running on the telecom endpoint, the focus (i.e., which process among simultaneously-executing processes will receive user input), analysis of displays to a user, and so forth. Inferences based upon the detection may be made either by the telecom endpoint, or by a processing element in the communication system, apart from but coupled to the telecom endpoint, which receives detection signals from the telecom endpoint, calculates inferences, and communicates resulting commands and/or configuration information to the telecom endpoint.

Audio/video telecom endpoint 110A may detect a change of activity by the user. A change of activity can be any event, interrupt, process, and the like, or the cessation of the same, that changes the perceived or inferred activity level of the user as being more actively or less actively participating in the video conference being displayed in user output device 111. For example, assume video conference application 115 is displaying the active video conference in video conference window 140. In this example, video conference window 140 completely fills user output device 111. The user receives an email and is alerted to the email. The user takes action in response that indicates less attention is being paid to the video conference window 140, for example by clicking with a mouse (user input device 112) to display the email application 114 on top of the video conference window 140. The email application 114 is now in the forefront of user output device 111. In this example, the change of focus indicates that the user has changed their active attention from video conference window 140 to email application window (141).

Likewise, a change of activity can occur in the other direction. For example, if the user reads the email and then wants to view the full video conference, the user could minimize or close the email window (141) so that the video conference window 140 is all that is displayed. In this example, the focus has changed from email application window 141 to video conference window 140. A change of focus can occur in different ways, such as the video conference application 115 detecting that the video conference window was maximized, the video conference window 140 was selected (e.g., opening it up after it was minimized, clicking on the video conference window, and the like), the video conference window 140 was minimized, the video conference window was moved, the application 114 was closed, the application 114 was started, the application window 141 was resized, the application window 141 was moved, a button was clicked, a menu was selected, and the like. Another example can be that of a screen saver. If the user has left the room for an extended period of time, the change of focus may be the initiation of the screen saver. A message can be displayed to the user to override the screen saver so that he/she can continue watching the video conference. Likewise, termination of the screen saver can also be a change of focus. If focus has changed to a screen saver, a brief waiting period may begin (e.g., about 10 seconds) before a lack of user activity is inferred, in order to allow for a user who is watching the video to perform some action (e.g., move the mouse, press a key, etc.) to dismiss the screen saver and bring focus back to the video conference.

Embodiments in accordance with the present invention propose to conserve bandwidth by reducing the data streamed to users who the embodiments infer are not actively participating in the conference, as indicated by a lack of activity. Embodiments will help reduce wasted uplink bandwidth by reducing the availability of bandwidth where it is not being used, e.g., by using a presence detector to shut down active video conference rooms that do not have any humans present. Embodiments in accordance with the present invention include a mechanism to infer the involvement of the caller, based upon at least one or more of the following primary indicia of involvement by the user, including performing the acts described below. Involvement may be inferred from detecting user activity, user inactivity, user attention, and/or user inattention.

Indicia of inactivity or inattention of one data stream may be used to save bandwidth used in another, related data stream. For example, inactivity or inattention related to an audio stream (e.g., a change in uplink muting) may be used to adjust the bandwidth devoted to downlink audio, or uplink and/or downlink video.

Weighting or confidence levels may also be assigned to the indicia of involvement. Inferred attention may be probative of at least a need for downlink bandwidth, whereas inferred activity may be probative of at least a need for uplink and downlink bandwidth. A change in need for bandwidth in one direction may or may not indicate a need for change in bandwidth in the opposite direction. For example, muting an uplink audio channel may be probative, but not highly probative, of less need for downlink bandwidth. This may occur if participants wish to only listen without being a contributing participant. On the other hand, an event such as leaving a room may be highly probative of reduced bandwidth needs for both uplink and downlink directions. Inferences about the need for audio bandwidth may be different than inferences about the need for video bandwidth, drawn from the same evidence, because the different nature of the two bandwidth streams may imply widely varying bandwidth rules. Weight may be assigned to the evidence, for example a sliding time window that assigns weight based upon how long ago an action occurred or was detected.

(a) Speaking in the conference is a sign of more active participation. Recent speaking may be given more weight than speaking a longer time ago. More continuous speaking may be given more weight than a brief utterance. For example, speaking uninterrupted for more than one minute may be indicative of a moderator or topic leader, whereas speaking for 20 seconds may be indicative of someone who is making substantive comments, and speaking for a second or two (e.g., saying "OK" or "uh-huh", etc.) may indicate a person who is not fully participating.

(b) Muting by users of the audio sent upstream may suggest a less active participation. Here, muting long ago that persists for a long time may be given a greater weight than a recent muting. Being on mute for a long time may be indicative of passive involvement that uses little or no bandwidth in the uplink direction. However, recent muting by users of the audio may be explained by a temporary need to have a brief side discussion locally with colleagues, outside of the conference. During the period of being muted there should be little or no need for uplink audio bandwidth, but inferences drawn from the length of the muting may be used to adjust the downlink video bandwidth.

(c) Absence from the room strongly suggests less active participation. Absence may be detected through a variety of means, either for a user sitting in front of a computer or for many users sitting in a dedicated conference room. However, merely moving away from a telecom endpoint is not necessarily probative of less active participation. Moving farther away from a telecom endpoint may be assigned a lower weighting, whereas leaving the room entirely is assigned a higher weighting. Furthermore, if there are more than one participant at a telecom endpoint and some but not all participants leave the room, this is not necessarily probative of the level of active participation by the remaining participants.

(d) Side activities performed at the telecom endpoint, and in particular a computer acting as the telecom endpoint, either by a user or automatically by the telecom endpoint. For example, the presence of additional interactions with the telecom endpoint (e.g., placing the call on hold, observing another window, occluding part of a video and/or audio stream, minimization of a video and/or audio stream window, activation of a screen saver, etc.).

Secondary indicia maybe used either to tend to confirm the primary indicia, or to tend to invalidate the primary indicia. For example, muting the upstream audio stream by a user would be a primary indicia of inactivity. However, secondary indicia such as local detection and processing of microphone inputs in the telecom endpoint may reveal acoustic signals such as a person talking or typing that imply presence. Therefore, in this example, the secondary indicia would tend to invalidate the inference drawn from the primary indicia.

In another example, a low motion score from a video codec may be a primary indicia that no one is in a room. A camera in a video conference may be configured to provide secondary indicia, e.g., by performing local facial detection and recognition, or by analyzing the image to detect whether room lights are on or off, or incorporating a motion detector. In this example, a secondary indicia of a lack of any recognized faces would tend to confirm the primary indicia. Again, the system may perform such analysis locally at the endpoint, without a need to send data upstream.

Changes to bandwidth usage are performed by the communication system transporting the conference call. Changes to bandwidth, in particular uplink bandwidth, may be made by a user's telecom endpoint. Changes to bandwidth, in particular downlink bandwidth, may be made by intermediate points within the communication system. For example, participant "A" of a conference call who is fully participating may send uplink signals using a relatively high amount of bandwidth. However, if participant "B" of the conference call is not actively participating, then the signals from participant "A" may be modified in order to use relatively less bandwidth before the signals are sent to participant "B".

Typically, a muted endpoint does not send uplink signals out of the endpoint. However, in some embodiments, a "virtual muting" technique can be used and the signals (audio, video, or a bandwidth-reduced version thereof) can be sent to another processing device (e.g., a media processor on a local area network) for analysis, for the purpose of analyzing for secondary indicia. In some embodiments, an inference related to activity or attention may be made by one or more processors in the communication system transporting the conference call, apart from the telecom endpoint, and a command based upon the inference is transmitted to the telecom endpoint.

In accordance with an embodiment of the present invention, audio/video telecom endpoint 110A detects indicia of activity, inactivity, attention, or inattention, such as the change of focus, and sends to A/V conference bridge 130 a message based on the change of focus or other indicia of activity, inactivity, attention, or inattention. The message that is sent can be implemented in various ways. The message can identify a specific type of focus or activity that has changed. For example, the message could indicate that the focus has changed from video conference window 140 to application window 141, from application window 141 to video conference window 140, the user has resized application window 141 to cover part of video conference window 141, the user resized video conference window 140, the user has moved the video conference window 140, the user has moved the application window 141, the user has minimized video conference window 140 (also indicating the amount of resizing), the user has maximized video conference window 140, the user has selected from the menu bar to change the focus from application window 141, and the like. The message can contain an instruction to change the stream of the active video conference in one or more different ways. For instance, the instruction (based on configuration information 134 that resides in audio/video telecom endpoint 110A or 110B (not shown)) can instruct codec 131 in the A/V conference bridge 130 to change the resolution of the video conference from 720 p to 480 p or to stop sending the video portion of the video conference to audio/video telecom endpoint 110A. Another option would be to only send keep-alive messages instead of sending the video portion of the video conference. The message can contain instructions that can cause codec 131 to change both the video portion of the video conference and the audio portion of the video conference.

Network interface 132 in A/V conference bridge 130 receives the message. Codec 131 changes the stream of the active video conference based on the message. For example, codec 131 can increase the resolution of the active video conference and/or use a higher quality audio encoder, based on a message that indicates that the user has maximized video conference window 140. Based on the message, network interface 132 sends the changed stream of the active video conference to audio/video telecom endpoint 110A. Audio/video telecom endpoint 110A receives the changed stream of the active video conference. Audio/video telecom endpoint 110A displays the changed stream of the active video conference in video conference window 140 via video conference application 115.

FIG. 1B is a block diagram of a second illustrative system 180 for detecting a change of activity (including change of focus) by a user and changing the stream of an active video conference based on the change of activity. Second illustrative system 180 comprises audio/video telecom endpoint 110A, audio/video telecom endpoint 110B, video telecom endpoint 160, and network 120. Audio/video telecom endpoint 110A further comprises user output device 111, user input device 112, video camera 113, application(s) 114, video conference application 115, and codec 116. User output device 111 further comprises video conference window 140 and application window 141. Video telecom endpoint 160 comprises codec 131, network interface 132, configuration information 134, and video conference application 115. Configuration information 134 is shown in video telecom endpoint 160, but can also reside in video conference router 150. Although video telecom endpoint 160 is shown comprising different elements, video telecom endpoint 160 may be similar or identical to audio/video telecom endpoint 110A.

Network 120 further comprises video conference router 150 or a video conferencing server. Video conference router 150 further comprises codec 131 and network interface 132. A/V conference router 150 routes video and/or audio streams of a video conference. For example, if a video conference is occurring between audio/video telecom endpoints 110A, 110B, and 160, video conference router 150 would route the video and/or audio streams from audio/video telecom endpoint 110A and 110E to video telecom endpoint 160. Video telecom endpoint 160 then would either mix the streams (sent from audio/video telecom endpoint 110A and 110B) into a single stream for display or display the two streams to the user. Likewise, video conference router 150 would route video and/or audio streams from audio/video telecom endpoint 110A and 160 to audio/video telecom endpoint 110B and video conference router 150 would route the video and/or audio streams from audio/video telecom endpoint 110B and 160 to audio/video telecom endpoint 110A. Audio/video telecom endpoints 110A and 110B would then mix the received streams for display or display the received streams to the user.

After a video conference is set up (e.g., between audio/video telecom endpoints 110A, 110B, and 160), video conference bridge 150 routes the video and/or audio streams of the active video conference. For example, audio/video telecom endpoints 160 and 110E send their streams of the active video conference to video conference router 150, which routes the streams to audio/video telecom endpoint 110A. Audio/video telecom endpoint 110A receives the streams of the active video conference from video router 150. Codec 116 decodes the video and/or audio streams and the video and/or audio streams are displayed by conference application 115 in user output device 111 (in video conference window 140).

Audio/video telecom endpoint 110A detects a change of activity (including a change of focus) by the user, for example a change in the quantity or rate of keystrokes, mouse events, or changes in the window that is configured to receive user inputs. Audio/video telecom endpoint 110A sends to network interface 132 in video telecom endpoint 160 a message based on the change of activity. The change of activity message could also be sent to audio/video telecom endpoint 110E if it supports similar functionality as video telecom endpoint 160. Network interface 132 in audio/video telecom endpoint 160 receives the message. Codec 131 changes the stream of the active video conference based on the message. Network interface 132 sends the changed stream of the active video conference to audio/video telecom endpoint 110A via video conference router 150. Audio/video telecom endpoint 110A receives the changed stream of the active video conference. Audio/video telecom endpoint 110A then displays the changed stream of the active video conference in video conference window 140 via video conference application 115.

In addition to or in place of network interface 132 in video telecom endpoint 160 receiving the change of activity message, network interface 132 in video conference router 150 can also receive the change of activity message and change the stream of the active video conference based on the change of activity message. For example, assume that a stream of the active video conference is sent from video telecom endpoint 160 to audio/video telecom endpoint 110A via video conference router 150. This stream of the active video conference (sent by codec 131) is a multi-layered bit stream where each successive layer adds extra information (i.e., typically extra resolution) to the layer below it. In response to receiving the change of activity message, codec 131 in video conference router 150 can strip off one or more of the successive layers or add back one or more successive layers that video conference router 150 was previously stripping off. The result is an overall lower bandwidth bit stream sent to audio/video telecom endpoint 110A.

The telecom endpoints may be packet-switched device, such as IP hardphones (e.g., Avaya Inc.'s 1600™, 4600™, and 5600™ Series IP Phones™), IP softphones running on any hardware platform such as PCs, Macs, smartphones, or tablets, (such as Avaya Inc.'s, IP Softphone™); Personal Digital Assistants or PDAs; Personal Computers or PCs, laptops; packet-based H.320 video phones and/or conferencing units; packet-based voice messaging and response units; and packet-based traditional computer telephony adjuncts.

The telecom endpoints may also include, for example, wired and wireless telephones, PDAs, H.320 video phones and conferencing units, voice messaging and response units, and traditional computer telephony adjuncts. Exemplary digital telecommunication devices include Avaya Inc.'s 2400™, 5400™, and 9600™ Series phones.

It should be noted that embodiments of the present invention do not require any particular type of information transport medium between switch or server and first and second telecommunication devices, i.e., embodiments of the present invention may be implemented with any desired type of transport medium as well as combinations of different types of transport media.

It should be emphasized the configuration of the switch, server, user telecommunication devices, and other elements as shown in FIG. 1A and FIG. 1B is for purposes of illustration only and should not be construed as limiting embodiments of the present invention to any particular arrangement of elements.

Embodiments in accordance with the present invention may provide more bandwidth options compared to the known art, in order to better tune or adapt uplink bandwidth usage to the user's needs or behavior. Bandwidth options may be applied independently to the audio and video portions of a video conference. For example, if a participant covers or disables their webcam, the video uplink may be video-muted even if the audio uplink continues at a relatively high bit-rate. Or, if a participant puts their audio on mute, the video portion may continue at a relatively high bit-rate if other indicia of activity or attention are present.

Embodiments in accordance with the present invention may provide a selectable lower signal quality with concomitant lower bandwidth requirement. Both audio signals and video signals are transmitted using standard codecs that are known in the art. For example, audio codecs may include but are not limited to ITU standards such as G.711, G.719, G.722, G.722.1, G.722.2, G.723.1 and G.729, Internet standards such as RFC 3119, RFC 3951 and RFC 3952, and proprietary standards such as SILK™ which is an audio compression format and audio codec used by Skype™. Video codecs may include ITU standards such as H.261 and H.263, Internet standards such as RFC 4425, industry standards such as MP4, QuickTime, AVI, JPEG 2000 and WMV.

Selecting different audio and/or video codecs provide different combinations of signal quality and bandwidth usage. Within each codec there may also be selectable levels of quality and bandwidth usage. For audio signals, selectable lower signal quality may include progressively lower bit rate encodings that may have progressively lower quality and/or lower intelligibility audio, and/or may be optimized primarily for speech (e.g., LPC-based encoders such as G.729 and G723.1). Audio bandwidth may be eliminated with complete muting.

Audio quality, in particular speech quality, is not necessarily equivalent to or highly correlated with intelligibility. Standards to measure intelligibility include ANSI standard S3.5-1997, "Methods for calculation of the speech intelligibility index" (1997). Although embodiments herein may be described in terms of audio quality, persons of skill in the art will recognize how to adapt these embodiments to use audio intelligibility, either instead of or in addition to audio quality.

For video signals, selectable lower signal quality may include lower frame rates, smaller images, increasing time between screen refreshes, alternative codecs, and so forth, providing progressively less quality. Video bandwidth may be eliminated with a blank screen. In some embodiments, the reduction in bandwidth may be explicitly noted, so that the active user is aware of a service degradation, e.g., from video resolutions of 720 p to 480 p to 360 p to 240 p, then to a still image every second, then to a thumbnail a minute and finally to a blank screen.

Embodiments in accordance with the present invention may provide an audio or visual notification or warning before changes to bandwidth or parameterizable policy limits or configurations are made. The null warning may be adequate; that is, some contexts may require no warning whatsoever. An audio notification or warning may include a beep or a softly spoken message (e.g., a countdown, "hit any key to avoid audio reduction in 10 seconds, 5 seconds . . . " etc.). A visual notification or warning may include may include a message on a video screen (e.g., "Reduction from 720 p to 480 p in 5, 4, 3, . . . "), or an icon or meter that is responsive to, or change with, the current video screen parameters. Audio and/or visual notifications may be provided after the action has been taken, either as a continuation of pre-action notifications or instead of pre-action notifications.

Embodiments in accordance with the present invention may provide expanded explicit and implicit mechanisms to undo changes to bandwidth or parameterizable policy limits or configurations, or to make a different selection. A system administrator or user may adjust whether bandwidth reduction should be accomplished by preferentially reducing audio bandwidth rather than video bandwidth, or by preferentially reducing video bandwidth rather than audio bandwidth. In one embodiment, an undo process may include usage of a user command or menu selection to increase signal quality, e.g., a menu selection to explicitly increasing video quality from 480 p to 720 p. If there is inadequate bandwidth available to support the requested change, the system may respond by denying the request, or by reducing other video parameters to compensate. For example, if adjusting resolution upward from 480 p to 720 p cannot be accommodated, then perhaps the frame rate may be reduced or the screen size is reduced, or the quality of other streams could be reduced to find bandwidth, depending on user priorities. In another embodiment, a user request to undo a bandwidth reduction may be inferred from a user action. For example, a user action to increase audio volume may be interpreted as a request to increase audio quality. Or, a user action to zoom in on part of a screen may be interpreted as a request to increase the video quality.

Analyses of signs of presence may be done either at endpoints or in intermediate media servers. If the analysis is performed in an intermediate media server, and if the analysis indicates that a bandwidth change is needed, the intermediate media server may issue a command to the transmitting telecom endpoint to change its audio and/or video transmitting bandwidth usage. Such a command may be sent via a separate channel. Alternatively, the transmitting telecom endpoint may continue to transmit audio and/or video at a high bit rate, and the intermediate media server will perform a conversion into a lower bit rate signal, e.g., by encoding conversion, video frame decimation, image clipping, layer management (e.g., with scalable video codecs or SVCs), etc.

Embodiments in accordance with the present invention may include a cost model, indicating the cost or savings of changes to bandwidth or parameterizable policy limits or configurations, in order to support better decision making. In some embodiments, a unit of bandwidth may have a constant cost. In other embodiments, bandwidth may be free up to a given limit, and then the bandwidth becomes much more expensive, or completely unavailable. Bandwidth may be more expensive in some geographic areas or with some service providers than others. Bandwidth cost may have a time-of-day dependency. Embodiments in accordance with the present invention may have access to a cost model for bandwidth usage, and may use this cost model when calculating a preferred, cost-effective approach for reducing bandwidth usage. Analyses of cost may be done either at endpoints or in intermediate media servers. The cost model may be stored in a local memory, or may be stored in a remote memory that is accessible to the telecom endpoint or network element that is performing the cost analysis.

Embodiments in accordance with the present invention may further incorporate a parameterizable policy, such that the value of certain limits or configurations may be changed during runtime in response to user preferences or detected user behavior. For instance, if a user who is presented a choice always avoids downgrading an image, the system becomes more hesitant to propose that; if another user always accepts, then the system might in the future downgrade that user sooner and with less of a warning. Examples of a parameterizable policy may include: (1) More aggressive downgrading for individual users with lower priority than conference rooms; or 2) Different time frames of inactivity detection before downgrading, based on priority. Embodiments in accordance with the present invention may implement bandwidth conservation based upon policy-based rules, because of the diverse parameters that should be considered. For example, a system may be initially provided with factory-default settings that later can be customized by users (e.g., system administrators, videoconference organizers, and individual videoconference participants), and which may depend on location (e.g., one set of parametric values for an office, another set of parametric values for conference calls when participating away from the office, another set of parametric values when using a telecom endpoint with lower bandwidth capacity like a mobile device, etc.).

Embodiments in accordance with the present invention include self-learning in order to derive improved changes to bandwidth or parameterizable policy limits or configurations, or to suggest changes to the parameters. The learning module may include recognition whether a user often or always at least partially undoes a recent system-initiated change, including recognition of how soon after the system-initiated change was made that the user at least partially undoes the change, then embodiments should not make the same system-initiated change in the future. For example, if a recent system-initiated change is to lower the frame rate of a video, but a user restores the frame rate but lowers the bandwidth by instead by changing the resolution of the video, then future system-initiated changes to reduce bandwidth should favor changes to resolution over changes to frame rate. Furthermore, a user change made soon after a system-initiated change will have more weight in the learning module than a similar user change made long after a system-initiated change.

Conversely, if a user does not undo a type of bandwidth-saving configuration change, then embodiments in accordance with the present invention may apply the same type of bandwidth-saving configuration change more quickly when a similar situation is present in a communication session, either the present session or a future session.

Figure 2:
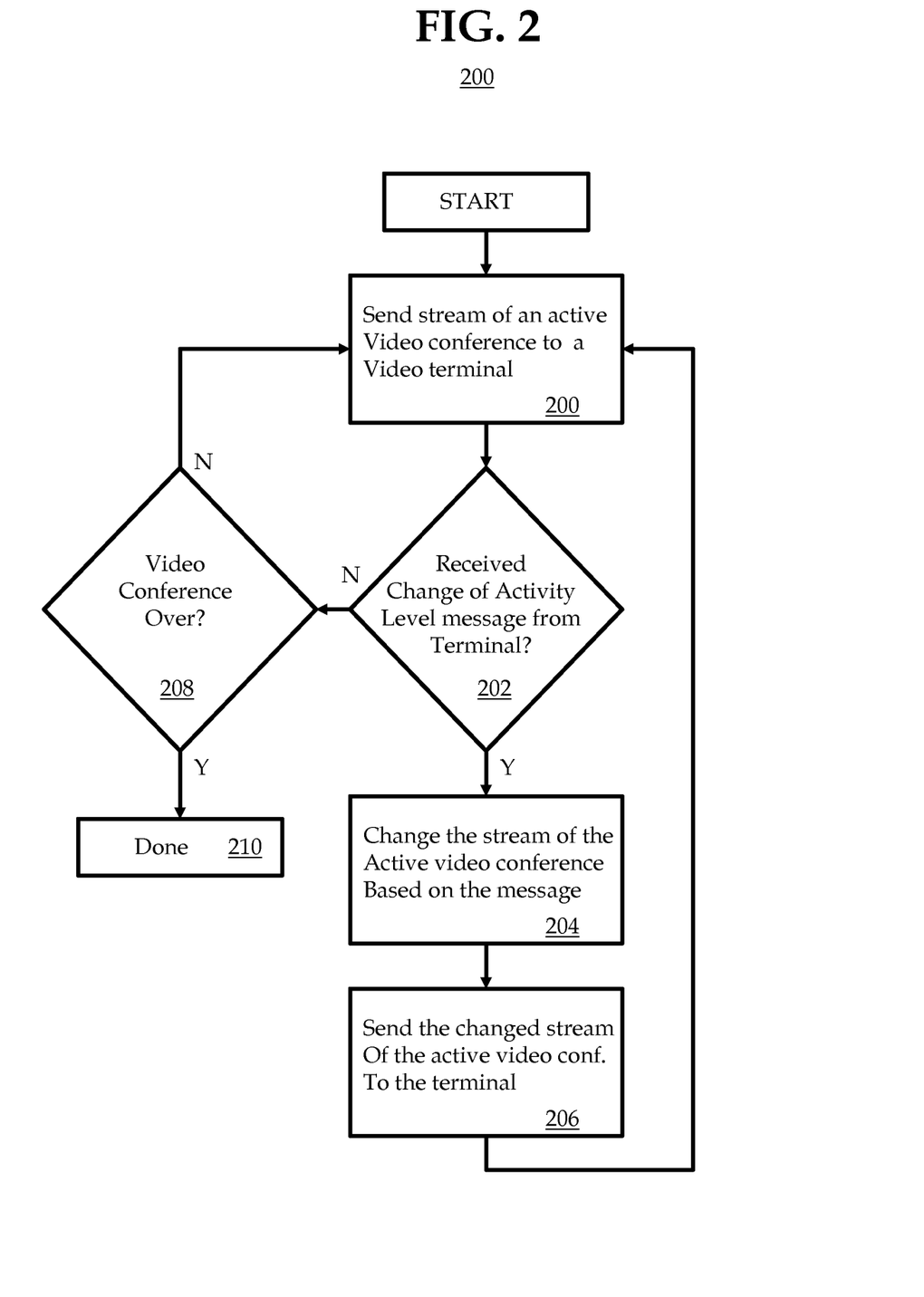
FIG. 2 illustrates a flow diagram of a method for detecting a change of activity level by a user and changing the stream of an active video conference based on the change of activity level, in accordance with an embodiment of the present invention.

FIG. 2 is a flow diagram of a method for detecting a change of activity (including a change of focus) by a user and changing the stream of an active video conference based on the change of activity. The method described in FIG. 2 is shown from the perspective of A/V conference bridge 130 or video telecom endpoint 160. Illustratively, Audio/video telecom endpoints 110A and 160, video conference router 150, and A/V conference bridge 130 are stored-program-controlled entities, such as a computer or processor, which performs the method of FIGS. 2-5 and the processes described herein by executing program instructions stored in a tangible computer readable storage medium, such as a memory or disk.

After the video conference is set up, network interface 132 sends 200 the stream of the active video conference to audio/video telecom endpoint 110A. Network interface 132 (in either video conference router 150 or video telecom endpoint 160) determines in step 202 if network interface 132 has received a change of activity message from audio/video telecom endpoint 110A. If network interface 132 has not received a change of activity message in step 202, video mixer 133/video telecom endpoint 160/video conference router 150 determines in step 208 if the active video conference is finished. If the active video conference is finished in step 208, the process is done 210. Otherwise, if the video conference is not finished in step 208, the process goes back to step 202.

Figure 3A:
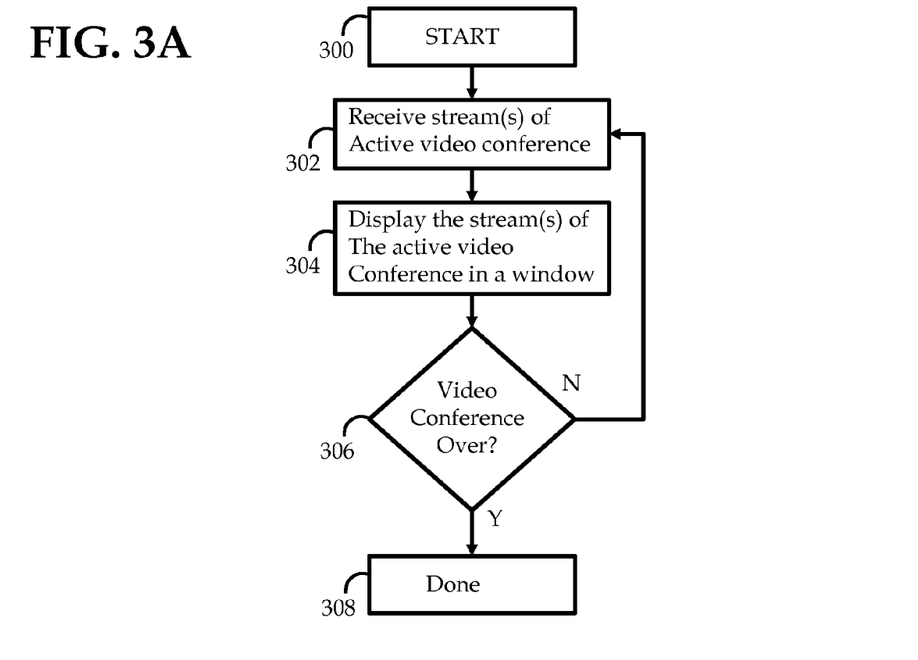
FIG. 3A illustrates a flow diagram of a method for receiving and displaying the audio and video stream of an active video conference, in accordance with an embodiment of the present invention.

If network interface 132 in step 202 has received a change of activity message (sent by audio/video telecom endpoint 110A in step 310 in FIG. 3), codec 131 changes 204 the stream of the active video conference based on the change of activity message. Network interface 132 sends 206 the changed stream of the active video conference to audio/video telecom endpoint 110A and the process goes to step 202. In step 206, the changed stream is typically continuously sent until a different change of activity message is received in step 202 or the video conference is done in step 210.

FIG. 3A is a flow diagram of a method for receiving and displaying the stream of an active video conference. The method described in FIG. 3A is shown from the perspective of audio/video telecom endpoint 110A. The process starts in step 300. Audio/video telecom endpoint 110A receives 302 the stream(s) of the active video conference (sent in step 200 in FIG. 2). Audio/video telecom endpoint 110A displays 304 the stream(s) of the active video conference in video conference window 140. The displayed stream(s) can be a composite stream sent from A/V conference bridge 130, one or more streams of the video conference, a stream that was mixed by audio/video telecom endpoint 110A, and the like. The process determines in step 306 if the active video conference is finished. If the active video conference is finished in step 306, the process is done 308. Otherwise, if the active video conference is not finished in step 306, the process goes to step 302.

Figure 3B:
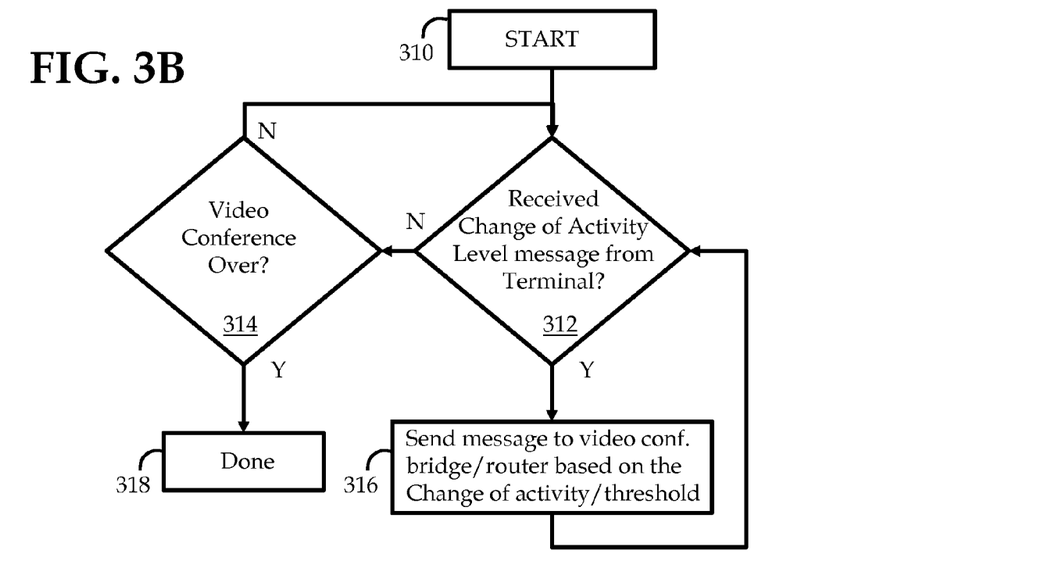
FIG. 3B illustrates a flow diagram of a method for detecting a change of activity level of a user, in accordance with an embodiment of the present invention.

FIG. 3B is a flow diagram of a method for detecting a change of activity (including a change in focus) by a user. The method described in FIG. 3B is shown from the perspective of audio/video telecom endpoint 110A. The process starts in step 310. Audio/video telecom endpoint 110A determines in step 312 if there has been a change of activity or a change in a bandwidth status. A change in bandwidth status may be, for example, if the amount of available bandwidth changes (e.g., as a function of WiFi signal strength or congestion, or by transferring a conference between a desktop telecom endpoint and a mobile telecom endpoint, etc.). The change in bandwidth status may exceed a threshold level before the bandwidth change initiates a change in video bit-rate and/or audio bit-rate.

If audio/video telecom endpoint 110A has not detected a change of activity/change in the power threshold in step 312, audio/video telecom endpoint 110A determines in step 314 if the video conference is finished. If audio/video telecom endpoint 110A determines in step 314 that the video conference is finished, the process is done 318. Otherwise, if audio/video telecom endpoint 110A determines that the video conference is not finished in step 314, the process goes back to step 312. If audio/video telecom endpoint 110A has detected a change of activity/power threshold in step 312, audio/video telecom endpoint 110A sends 316 a message to A/V conference bridge 130/video telecom endpoint 160 based on the change of activity/threshold. The process then goes to step 312.

Figure 4:
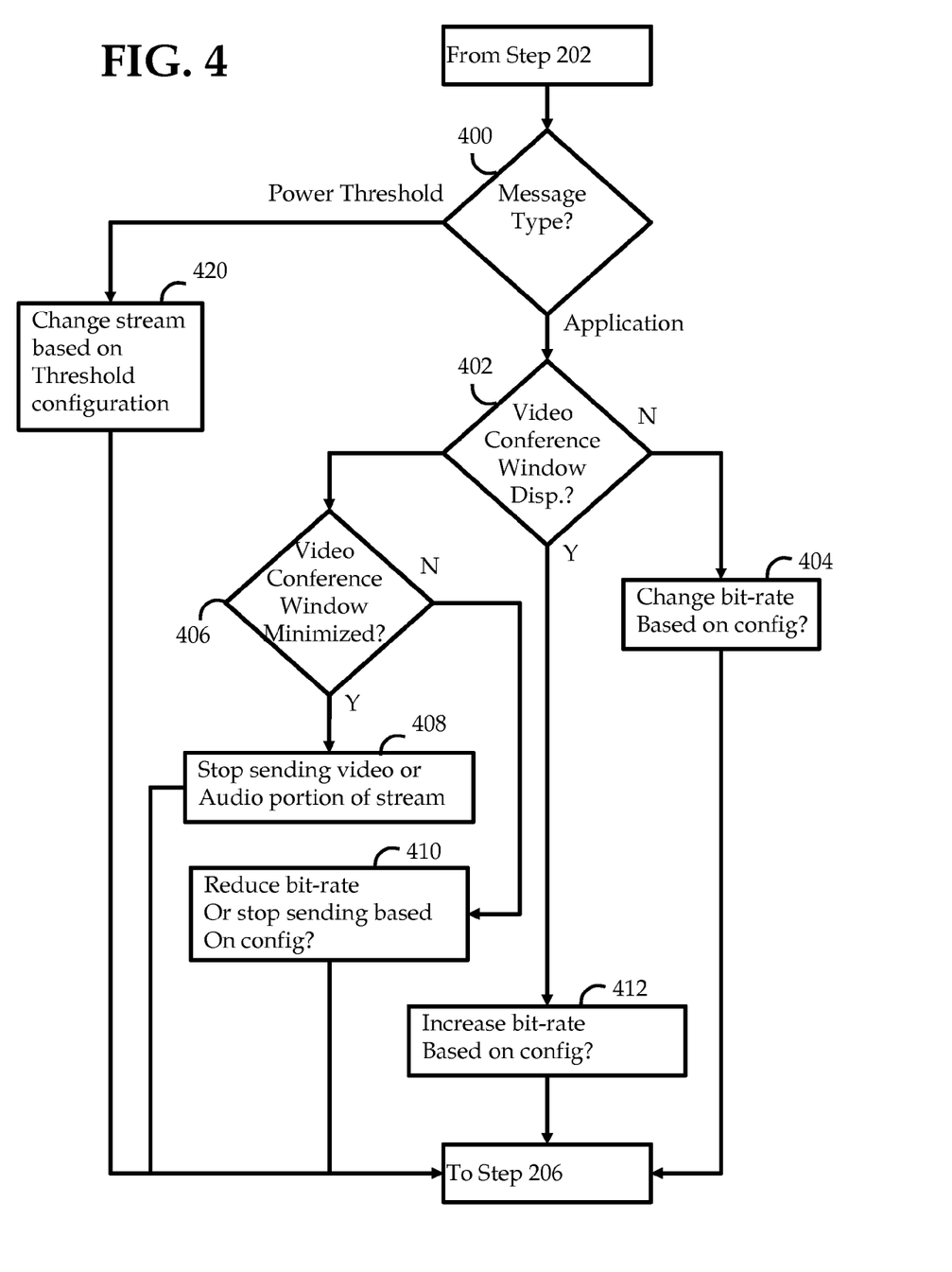
FIG. 4 illustrates a flow diagram of a method for handling different message types, in accordance with an embodiment of the present invention.

FIG. 4 is a flow diagram of a method for handling different message types. FIG. 4 is an exemplary method of step 204 in FIG. 2. After receiving a message from audio/video telecom endpoint 110A in step 202, codec 131 (in either video conference router 150 or video telecom endpoint 160) determines the message type in step 400. If the message type in step 400 is a change in bandwidth threshold, codec 131 changes 420 the stream of the active video conference based on configuration information 134 and the process goes to step 206. For example, assume that the message indicated a drop in bandwidth available to audio/video telecom endpoint 110A. Based on configuration information 134, codec 131 changes the resolution of the stream of the active video conference from 720 p to 480 p. This reduction in resolution results in lower bandwidth usage in audio/video telecom endpoint 110A due to fewer bits needed to produce a lower-resolution display of the active video conference. Likewise, if the change in available bandwidth was that more bandwidth is available to audio/video telecom endpoint 110A (e.g., the laptop is now using a stronger or less congested WiFi connection), codec 131 can change the resolution of the stream of the active video conference from 480 p to 720 p.

If the message type in step 400 is an application message, the process determines how video conference window(s) 140 are displayed (relative to how video conference window 140 was previously displayed and/or how application window(s) 141 are displayed) to the user in step 402. If video conference window 140 is displayed less in step 402 (for example, the user opened application window 141 over a portion or all of video conference window 140 or video conference window 140 has been minimized), or if other indicia of reduced activity are detected (e.g., less voice, keyboard, mouse, or motion activity, etc.), the process determines in step 406 if video conference window 140 has been minimized. If video conference window 140 has not been minimized in step 406, codec 131 can optionally reduce the bit-rate (e.g., by reduced video resolution, muting audio, stop sending the video portion of the stream of the active video conference, send keep-alive messages instead of sending the video portion of the stream of the active video conference, and the like) in step 410. A muted endpoint may still analyze sounds in the vicinity of the endpoint, and continue to detect changes in sound activity to decide on activity/absence. For instance, codec 131 can reduce the video resolution of the stream of the active video conference, based on configuration information 134, if application window 141 covers most of video conference window 140. Codec 131 can, based on configuration information 134, stop sending in step 410, the video and/or audio portion of the stream of the active video conference if application window 141 completely covers video conference window 140. Moreover, codec 131 may elect to leave the bit-rate of the stream of the active video conference at the current setting based on configuration information 134 in step 410; for example, if only a small percentage of video conference window 140 is covered by application window 141. After completing step 410, the process goes to step 206. If video conference window 140 has been minimized in step 406, codec 131 stops sending 408 the video and/or audio portion of the stream of the active video conference and the process goes to step 206.

If video conference window 140 is displayed more (relative to how video conference window 140 was previously displayed and/or how application window 141 is displayed) in step 402, or other indicia of reduced activity are detected, codec 131 can optionally increase in step 412 the bit-rate of the stream of the active video conference based on configuration information 134, for instance by increasing the video resolution. For example, video resolution may be increased if the user has substantially increased the size of the video conference window 140 to cover most of application window 141, or if a substantial increase in user activity is detected. On the other hand, codec 131 may elect to not change the video resolution if the user has only minimally increased the size of video conference window 140 or their level of activity. After completing step 412, the process goes to step 206.

If the displayed video conference window is the same in step 402 (for example, the user just selected or changed focus to application window 141, but video conference window 140 is displayed similarly to the user), codec 131 can optionally change 404 the bit-rate (e.g., by changing the video resolution or audio coding) based on configuration information 134. On the other hand, codec 131 may elect to not change the bit-rate of the stream of the active video conference in step 404. Once step 404 is completed, the process goes to step 206.

Figure 5:
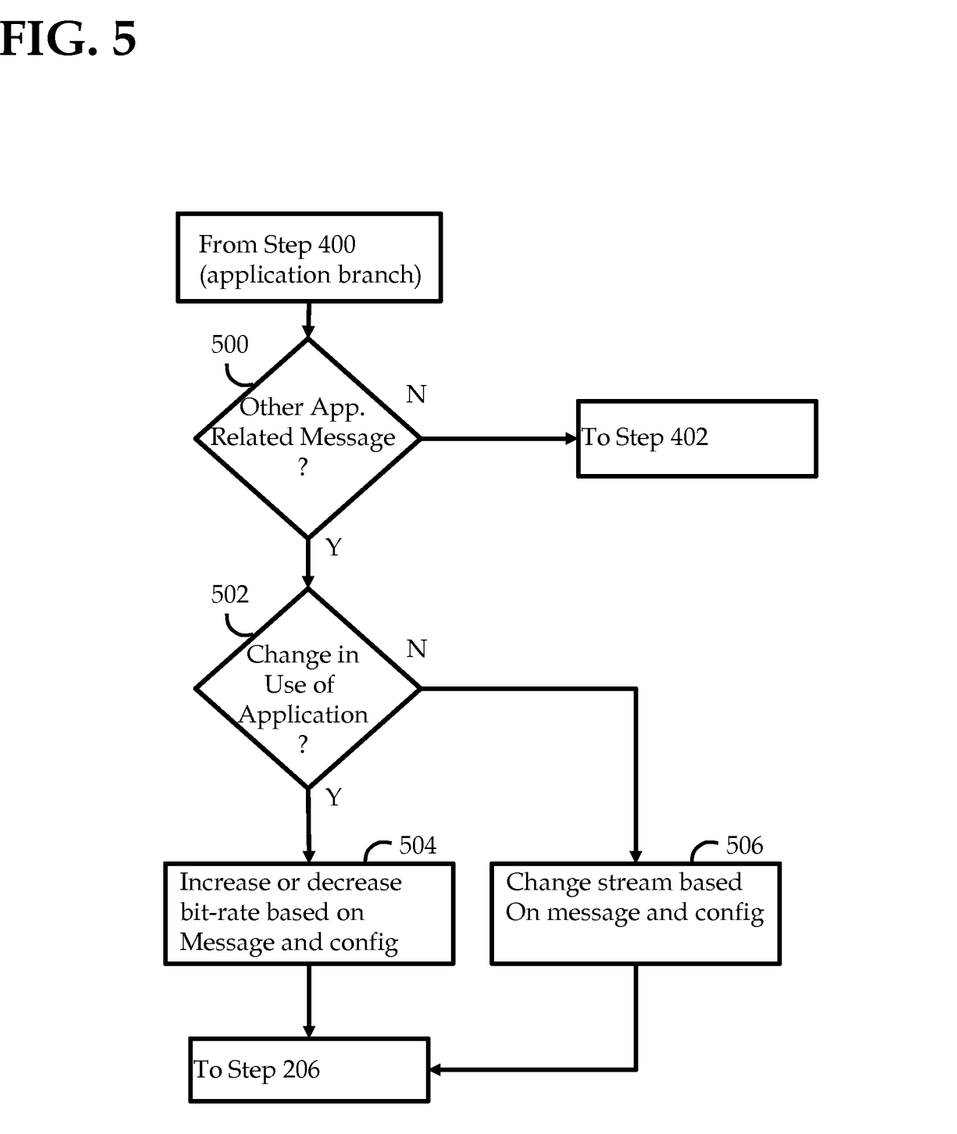
FIG. 5 illustrates a flow diagram of a method for handling other activity-related messages, in accordance with an embodiment of the present invention.

FIG. 5 is a flow diagram of a method for handling other activity-related messages. The method of FIG. 5 is shown as going in between step 400 (application branch) and step 402. After determining that the message is application-related in step 400, the process determines in step 500 if the message is another application-related message. Other application-related messages can be, for example, where the user has stopped using application 114 for a specific period of time, and the like. If the message is not another application-related message in step 500, the process goes to step 402.

Otherwise, if the message is another application-related message in step 500, the process determines in step 502 if the message is a change in use message (e.g., the user has stopped typing and clicking in application window 141 for the last five seconds). If the message is a change of use message in step 502, codec 131 can at step 504 change the bit-rate of the audio and/or video portion of the stream of the active video conference based on configuration information 134. For example, if the message is that the user has stopped using application 114 by not clicking/typing for a period of time, codec 131 can increase the resolution of the stream of the active video conference from 480 p to 720 p in step 504. Once step 504 is completed the process goes to step 206.

If the message is not a change in use message in step 502, codec 131 changes 506 the audio and/or video stream of the active video conference based on configuration information 134. For example, if the message is that the user has increased his/her level of activity (as observed by video camera 113), codec 131 can increase the video resolution of the active video conference in step 506. Likewise, if the message is that the user has decreased his/her level of activity, codec 131 can lower the video resolution of the active video conference in step 506. Moreover, similar messages can be sent based on other indicia of user activity or inactivity, such as the user looking (i.e., having a conversation) at another person in the room rather than participating in the video conference, etc. After step 506 is completed the process goes to step 206.

Embodiments of the present invention include a system having one or more processing units coupled to one or more memories. The one or more memories may be configured to store software that, when executed by the one or more processing unit, allows for management of bandwidth used by a telecom endpoint, at least by use of processes described herein, including at least in FIGS. 2-5, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method to manage bandwidth used by a telecom endpoint of a communication session, the method comprising:
   detecting, by a sensor coupled to a communication system transporting the communication session, a first indicia of a user;
   receiving, by a processor of the communication system transporting the communication session, a second indicia of the user that is detected by the telecom endpoint independently of the sensor;
   inferring, by the processor of the communication system transporting the communication session, a first involvement by the user in the communication session, wherein inferring is based upon the detected first indicia of the user;
   inferring, by the processor of the communication system transporting the communication session, a second involvement by the user in the communication session, wherein inferring the second involvement comprises using the detected second indicia of the user;
   determining a verification of the first involvement using the second involvement;
   determining a relative level of involvement by the user relative to other users; and
   modifying, by a conference bridge within the communication system and apart from both the telecom endpoint of the communication session and a provider server transporting the communication session, a bandwidth of the communication session based upon the first inferred involvement by the user, the verification, and the determined relative level of involvement.

2. The method of claim 1, wherein modifying a bandwidth of the communication session comprises modifying the bandwidth based upon a parameterizable policy.

3. The method of claim 1, wherein detecting a first indicia of a user comprises detecting, by the sensor, an act of the user speaking.

4. The method of claim 1, wherein detecting a first indicia of a user comprises detecting, by the sensor, an act of the user muting the telecom endpoint.

5. The method of claim 1, wherein detecting a first indicia of a user comprises detecting, by the sensor, an act of the user leaving the telecom endpoint.

6. The method of claim 1, wherein detecting a first indicia of a user comprises detecting, by the sensor, an act of the user performing side activities on the telecom endpoint.

7. The method of claim 1, wherein inferring a first involvement further comprises inferring a detection of inactivity of the user.

8. The method of claim 1, wherein inferring a first involvement further comprises inferring a detection of inattention of the user.

9. The method of claim 1, wherein modifying the bandwidth of the communication session comprises selecting a lower-bandwidth video link.

10. The method of claim 1, wherein modifying a bandwidth of the communication session comprises selecting a lower-bandwidth audio link.

11. The method of claim 1, further comprising:
    retrieving a bandwidth policy from a memory coupled to the communication system, wherein the step of modifying the bandwidth of the communication session is based upon the retrieved bandwidth policy.

12. The method of claim 1, further comprising:
    retrieving a bandwidth cost model from a memory coupled to the communication system, wherein the step of modifying the bandwidth of the communication session is based upon the retrieved cost model.

13. The method of claim 1, further comprises providing a notification to the user of the modified bandwidth of the communication session.

14. The method of claim 1, wherein modifying a bandwidth of the communication session further comprises modifying the bandwidth based upon a control sent to the telecom endpoint.

15. The method of claim 1, further comprising:
    self-learning, by a processor coupled to the communication system, of bandwidth-related user preferences.

16. A system to manage bandwidth used by a telecom endpoint of a communication session, the system comprising:
    a sensor configured to detect an indicia of a user;
    a processor coupled to the sensor, the processor configured to:
       detect, independently of the sensor, a second indicia of a user;
       infer a first involvement by the user in the communication session;
       infer a second involvement by the user in the communication session, wherein inferring the second involvement comprises using the second detected indicia of the user;
       determine a verification of the first involvement using the second involvement; and
       determine a relative level of involvement by the user relative to other users; and
    a bandwidth controller configured to modify a bandwidth of the communication session based upon the first inferred involvement, the verification, and the relative level of involvement by the user, wherein the bandwidth controller is located apart from both the telecom endpoint of the communication session and a provider server transporting the communication session.

17. The system of claim 16, wherein the first involvement comprises a detection of inactivity by the user.

18. The system of claim 16, wherein the processor detects the second indicia of the user by determining if the user has activated an application other than the communication session on the telecom endpoint.

19. The method of claim 1, wherein detecting, by the telecom endpoint and independently of the sensor, a second indicia of a user further comprises determining if the user has activated an application other than the communication session on the telecom endpoint.

20. A method to manage bandwidth used by a telecom endpoint of a communication session, the method comprising:

detecting, by a sensor coupled to a communication system transporting the communication session, a first indicia of a user;

detecting, by the telecom endpoint and independently of the sensor, a second indicia of the user;

inferring, by a processor of the communication system transporting the communication session, a first involvement by the user in the communication session, wherein inferring is based upon the detected first indicia of the user;

inferring, by the processor of the communication system transporting the communication session, a second involvement by the user in the communication session, wherein inferring the second involvement comprises using the detected second indicia of the user;

determining a verification of the first involvement using the second involvement;

determining a relative level of involvement by the user relative to other users; and     modifying, by a conference bridge within the communication system and apart from both the telecom endpoint of the communication session and a provider server transporting the communication session, a bandwidth of the communication session based upon the first inferred involvement by the user, the verification, and the determined relative level of involvement.

\* \* \* \* \*